United States Patent [19]

Kassarjian

[11] Patent Number: 5,074,331

[45] Date of Patent: Dec. 24, 1991

[54] METHOD AND MEANS FOR REDISTRIBUTING REACTOR FLOW

[75] Inventor: John R. Kassarjian, LaPlace, La.

[73] Assignee: Marathon Oil Company, Findlay, Ohio

[21] Appl. No.: 691,667

[22] Filed: Apr. 25, 1991

Related U.S. Application Data

[63] Continuation-in-part of Ser. No. 609,683, Nov. 6, 1990, abandoned.

[51] Int. Cl.⁵ .............................................. B01F 3/06
[52] U.S. Cl. ................................. 137/561 A; 137/74; 261/97
[58] Field of Search ............... 137/561 A, 561 R, 72, 137/74; 261/97

[56] References Cited

U.S. PATENT DOCUMENTS

| | | | |
|---|---|---|---|
| 3,038,790 | 6/1962 | Beggs et al. | 261/97 |
| 3,378,349 | 4/1968 | Shirk | 261/97 X |
| 3,446,489 | 5/1969 | Leva | 261/97 |
| 3,502,445 | 3/1970 | Ballard et al. | 261/97 X |
| 3,996,317 | 12/1976 | Sarmiento et al. | 261/97 |
| 4,285,910 | 8/1981 | Kennedy, Jr. | 261/97 X |
| 4,505,879 | 3/1985 | Lhonore et al. | 137/561 A X |
| 4,565,216 | 1/1986 | Meier | 137/561 A |
| 4,569,364 | 2/1986 | Keller et al. | 137/561 A X |
| 4,580,597 | 4/1986 | Cordingley et al. | 137/561 A |

Primary Examiner—John Rivell
Attorney, Agent, or Firm—Jack L. Hummel; Jack E. Ebel

[57] ABSTRACT

Method and means for redistributing fluid flow through a catalyst bed in a reactor by applying uniform flow resistance. A mat to which a series of uniformly spaced disks are adhered is placed within the catalyst bed. The disks are formed of a material capable of withstanding the temperatures within the reactor, while the mat is formed of a material which is not. The mat is destroyed by the heat of the reactor, leaving the disks in place. Localized high flow rates are smoothed out by the flow resistance provided by the disks, with flow taking place between the disks. Since the disks are small relative to the opening used to dump the spent catalyst, special consideration for disk recovery and handling are not necessary as the disks flow out the opening with the spent catalyst.

19 Claims, 3 Drawing Sheets

METHOD AND MEANS FOR REDISTRIBUTING REACTOR FLOW

CROSS REFERENCE TO RELATED APPLICATIONS

This application is a continuation-in-part of copending U.S. patent application Ser. No. 07/609,683, filed Nov. 6, 1990, now abandoned.

FIELD OF THE INVENTION

This invention relates to reactors in which fluid reactants flow through a bed of catalytic material More particularly, it relates to a method and means for redistributing flow through the bed.

BACKGROUND OF THE INVENTION

The design of reactors used in chemical processes varies widely in accordance with the particular reactions taking place. In general, however, most involve the use of at least one bed of catalyst particles through which the reactants flow. The catalyst particles are supported on a grate or other open support means which enables fluid to flow through the catalyst bed and its support to the reactor outlet. A fluid distribution device is normally provided between the reactor inlet and the catalyst bed in order to uniformly distribute fluid to the catalyst bed.

Despite the initial uniform flow of fluid into the catalyst bed, higher localized flow rates within the bed are quite often encountered, causing less than optimum operation of the reactor since the time of contact of the reactants with the catalyst material will vary depending upon the section of the catalyst bed through which the reactants flow. Measures to provide a more uniform reactor flow have been suggested, but these typically involve the use of complicated mechanical designs for altering and controlling fluid flow prior to entry into the catalyst bed. Although satisfactory to a degree, such measures still are not capable of satisfactorily controlling the flow within the catalyst bed itself.

It would be desirable to be able to efficiently control reactor flow within the catalyst bed to make it more uniform, and to do so by economical means which does not require a special design of reactor.

BRIEF SUMMARY OF THE INVENTION

The invention provides means for applying a uniform flow resistance across a catalyst bed so that any localized high flow rates will encounter higher flow resistance than at other locations, causing a redistribution of the flow to a more uniform pattern. This is carried out by providing a transversely extending layer of spaced barriers to fluid flow within the catalyst bed. The barriers are structurally unconnected to the reactor, thus obviating the need for a special reactor design. The spacing between the barriers is such that the barriers do not impede flow through the catalyst bed, but will cause localized high flow currents encountering them to be slowed.

Preferably, the barriers take the form of disks attached to a support, such as a mat. The disks are made of a material which is able to withstand the operating conditions of the reactor while the support is made of a material which is unable to withstand one or more of the operating conditions, such as temperature, pH or some other condition. After placing the support within the bed and activating the reactor, operating conditions are reached within the reactor which destroy the support, leaving the disks in place to provide the desired flow resistance. The disks can be removed from the reactor upon removing the spent catalyst particles.

The cost of the flow redistribution means of the invention is minimal, yet the invention provides the necessary degree of flow resistance to obtain a more uniform flow pattern through the reactor without interfering with the operation of the reactor.

The various features of the invention which enable more uniform flow through a reactor to be achieved are brought out in more detail in the description which follows, wherein the above and other aspects of the invention, as well as other benefits thereof, will readily be apparent.

DETAILED DESCRIPTION OF THE PREFERRED EMBODIMENT

Figure 1:
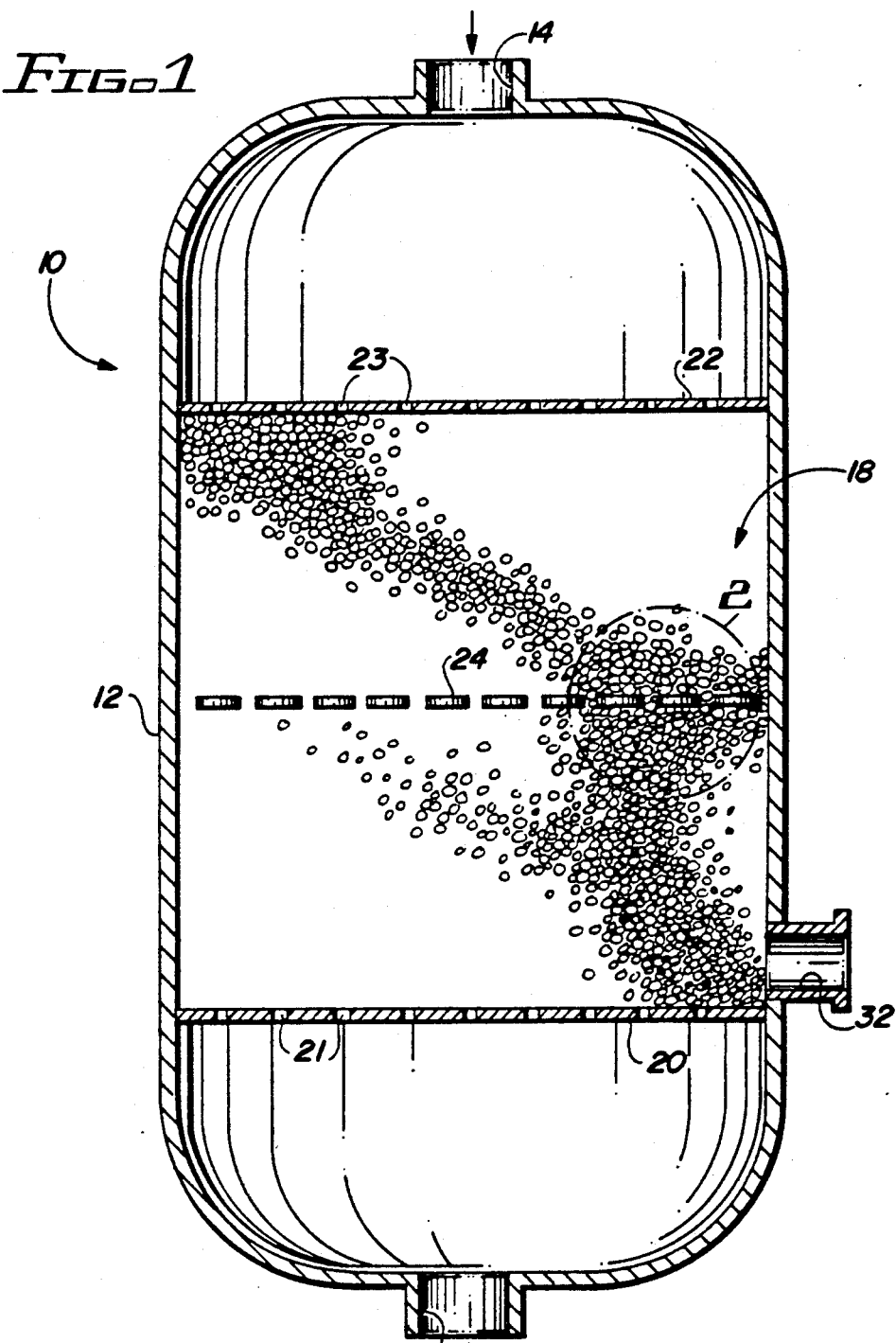
FIG. 1 is a simplified longitudinal sectional view of a reactor incorporating the flow redistribution means of the invention.

Referring to FIG. 1, a reactor 10 comprises a vessel 12 having an inlet 14 at one end and an outlet 16 at the other end. Although structure denoting the particular operational details of the reactor have not been shown since it is not pertinent to the invention, it will be understood that the reactor would be provided with all the necessary accessories, including conduits, heaters and controls, to make it operable. A catalyst bed 18 is supported on grate 20, which includes open areas 21, while an upper frame 22, also including open areas 23, is in contact with the upper end of the bed. The frame 22 may be designed to distribute reactant fluid uniformly over the surface of the catalyst bed 18 or additional structure may be provided for this purpose. In either case, the normal design of the reactor would provide for such uniform distribution of the fluid.

Figure 2:
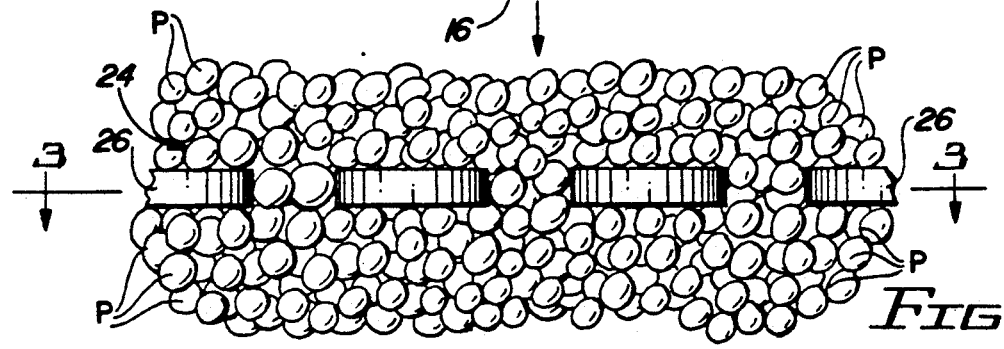
FIG. 2 is an enlarged view of the area enclosed in the circle 2 of FIG. 1.
Figure 3:
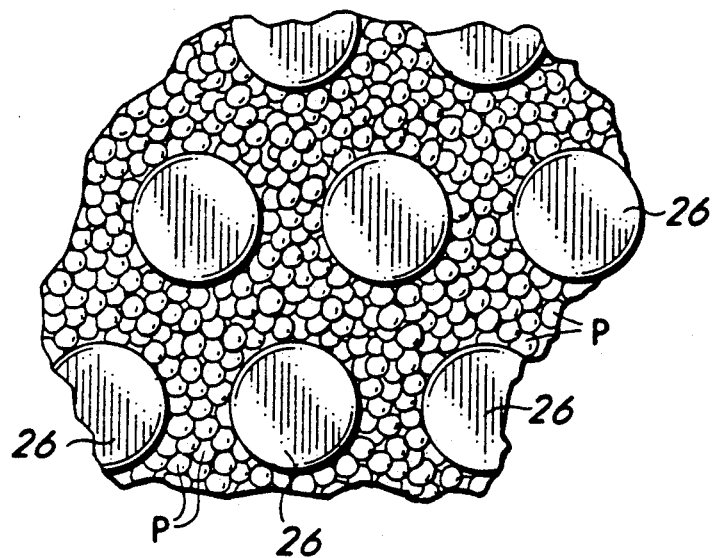
FIG. 3 is an enlarged sectional view taken on line 3—3 of FIG. 2.

Referring to FIGS. 1, 2 and 3, in accordance with the invention a layer 24 of spaced disks 26 is provided intermediate the ends of the catalyst bed. The disks are located so that fluid flowing down through the upper portion of the bed 18 will contact them and be forced to flow around them through the spaces between them. As illustrated, the disks are embedded among the catalyst particles P and are greater in diameter than the diameter of the particles, with the spaces between the disks preferably also being greater than the size of the particles. This arrangement maintains the reactant fluid in contact with the catalyst particles throughout its path through the catalyst bed. Moreover, any tendency for fluid to flow more rapidly through one section of the bed than another will be met by an increase in pressure, with a corresponding resistance to flow, which is felt by the fluid in the area in question as it encounters the disks. This causes the fluid to seek other less resistant paths and results in a smoothing or redistribution of the flow to a more uniform pattern.

Figure 4:
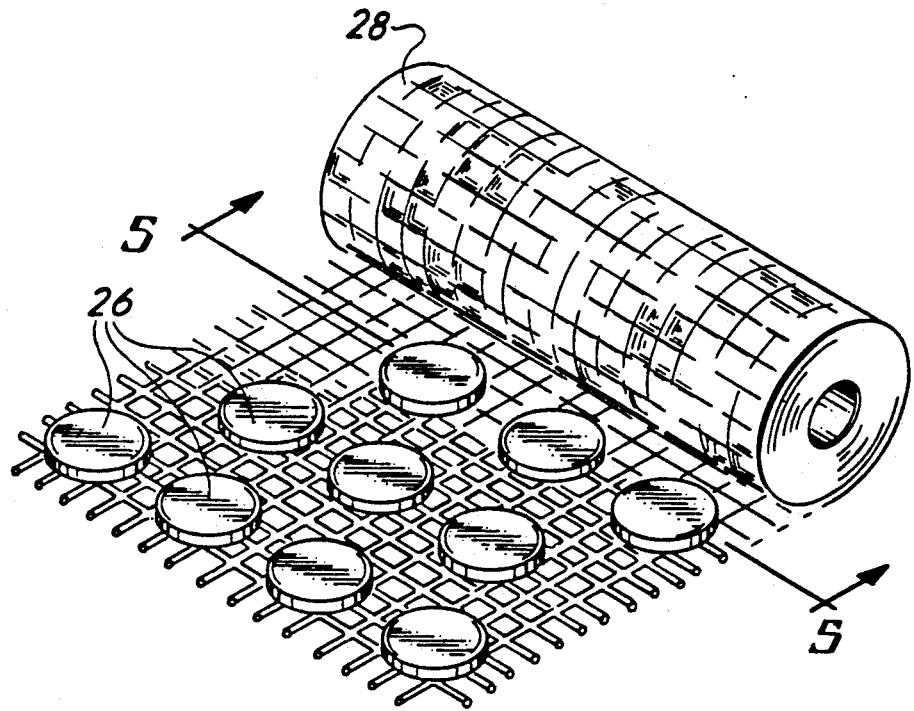
FIG. 4 is a pictorial view of a mat to which the disks used as flow barriers are attached.
Figure 5:
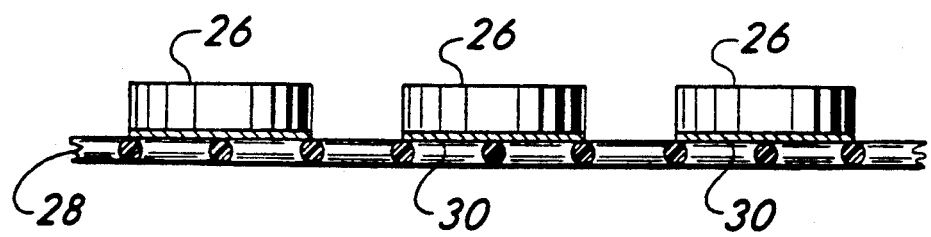
FIG. 5 is an enlarged sectional view taken on line 5—5 of FIG. 4.

In order to place the disks in a catalyst bed so that they are properly spaced and in their desired locations, the disks 26 are attached to a flexible support such as the mat 28 shown in FIG. 4. The flexible support will provide negligible flow resistance to fluid flow through reactor 10. Accordingly, mat 28 is preferably a mesh, network or screen constructed from, for example, plastic, silk, synthetic fibers, such as, nylon or rayon, or mixtures thereof. Further exemplary, the screen may have 1 cm dimensioned apertures uniformly spaced across the dimensions thereof. The apertures present in the screen may have any suitable peripheral configuration as will be evident to the skilled artisan. In the illustration of FIG. 5, the disks are attached to the mat 28 by adhesive 30. Any other suitable attachment means may be used, such as for example by attaching the disks to a plastic mat by means of a heat seal. The mat is preferably flexible because a flexible form facilitates placement in the catalyst bed. Consistent with this, the mat 28 is depicted in FIG. 4 as being in roll form.

Figure 6:
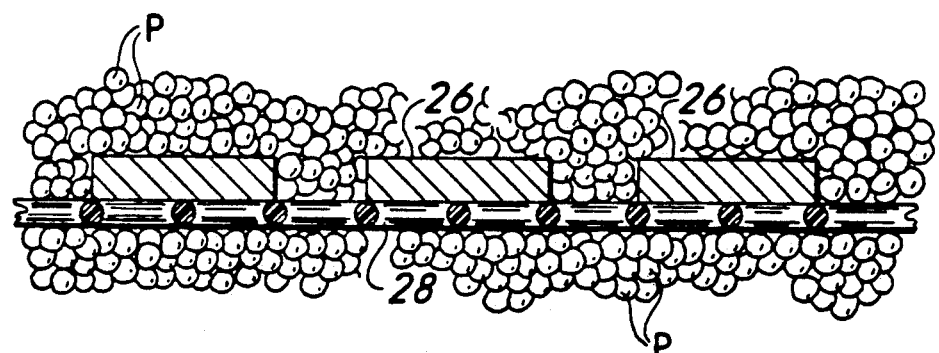
FIG. 6 is a sectional view similar to that of FIG. 2, but showing the disks in place within a catalyst bed before the reactor has been activated.

The disks are comprised of a material which can tolerate the operating conditions, such as high temperatures, acidity, alkalinity, etc., encountered in a reactor, while the support mat is comprised of a material which cannot tolerate all such conditions and which disintegrates when exposed to the condition it cannot tolerate. For example, the mat may melt at temperatures encountered in a reactor, may be solubilized by fluids in the reactor, may be solubilized by an acidic or basic fluid in the reactor, or may be otherwise destroyed by some intolerable condition encountered in the reactor. The disks are installed by placing the mat 28 and attached disks 26 on the bed of catalyst particles at an intermediate point in the construction of the bed, and then completing the construction of the bed. Preferably, the mat should extend out to the walls of the reactor vessel 12 in order to locate the disks across the entire bed. This leaves the mat and attached disks in the condition shown in FIG. 6, lying intermediate the ends of the catalyst bed in a location within the bed as illustrated by the layer of disks in FIG. 1.

Within a relatively short period of time after activating the reactor e.g., less than one hour, the mat material will be melted or otherwise destroyed due to its inability to tolerate the condition(s) within the reactor, leaving the disks in place, spaced according to the same spatial relationship as when they were attached to the mat. It will be understood that the spatial relationship of the disks may be engineered specifically for each application. The disks are able to remain in position during operation of the reactor due to the weight of the catalyst particles holding them in place and to the shifting of the particles into the spaces between the disks as the mat is destroyed, thereby preventing the disks from shifting. It will also be understood that the mat will not discernibly affect fluid flow through the reactor during the relatively short period of time after reactor activation and before the intolerable condition(s) within the reactor are achieved and the mat is destroyed.

The disks may be formed from any material capable of withstanding the operating conditions of the reactor and capable of being produced in the desired shape and dimensions. A suitable ceramic material or catalyst be used to form the disks. Preferably the disks are formed from the same catalyst composition used for the particles of the catalyst bed.

As previously indicated, the disks should be of a size to provide greater flow resistance than the particles are able to provide in order to redistribute the flow when local high flow rates occur. This means that they should be larger in diameter than the size of the catalyst particles. In a typical arrangement, in a catalyst bed employing particles having an average size of ¼ inch, circular disks having a diameter of 1 inch may be provided on 1¼ inch centers. This leaves a ¼ inch gap between the closest points of adjacent disks and ensures that the layer of disks, while providing the desired level of flow resistance, does not interfere with the continuous flow of fluid through the reactor. Such an arrangement also enables the disks to be removed along with the spent catalyst particles through the catalyst exhaust nozzle 32 shown in FIG. 1. The exhaust nozzle is illustrated as being located above the catalyst support grate 20 to enable removal of the relatively large disks. The nozzle may instead be located below the catalyst bed, if preferred, in which case a bed of inert support balls of a size capable of passing through the exhaust nozzle would be provided to support the bed of catalyst particles. Such an arrangement, which is well known to those skilled in the art, would permit removal of the disks along with the support balls. The disks in addition should be of such thickness as to provide adequate strength to resist the stresses to which they might be subjected during attachment to the mat and installation in the catalyst bed. A thickness of about ¼ inch would be typical.

Figure 7:
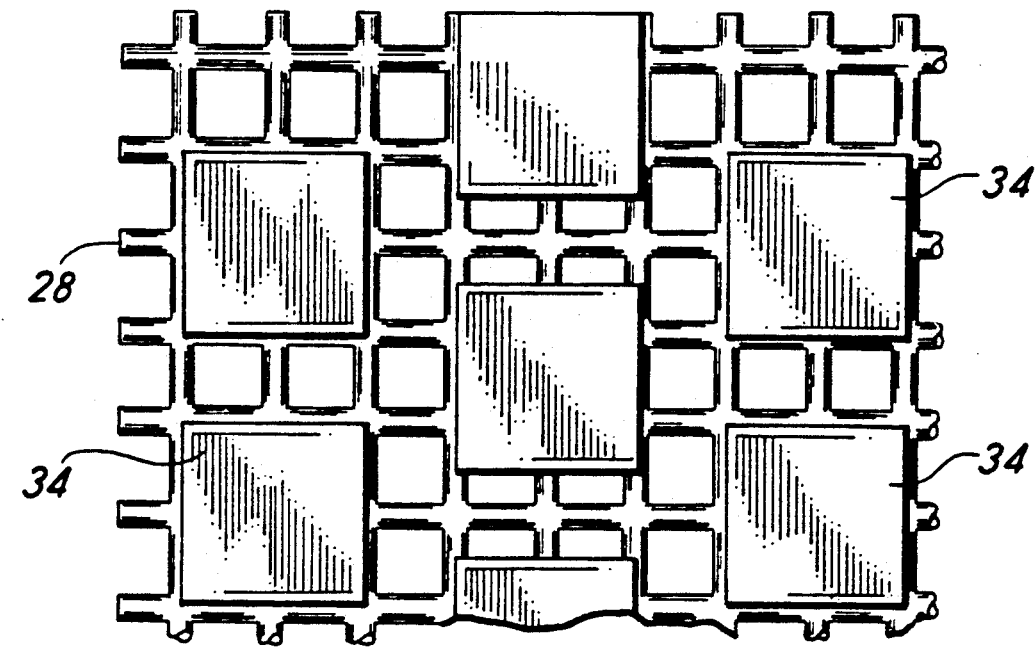
FIG. 7 is a plan view of a portion of a support mat, showing disks of different shape.

Although the disks shown in FIGS. 1–6 of the drawing are circular in shape, they may be provided in other shapes as well. For example, the arrangement of FIG. 7, wherein square disks 34 are attached to the support mat 28, may be used. Still other shapes, such as any polygonal form, may be employed, keeping in mind that whatever their shape the disks still have to be properly sized and spaced to permit the desired flow during operation of the reactor. As applied to shapes other than circular, the disks should be spaced apart a distance greater than the average diameter of the catalyst particles, and the average diameter or width of the disks should be greater than the average diameter of the catalyst particles.

The invention has been described in connection with the illustrations in the drawing wherein a single layer of disks is provided at an intermediate point shown as being at the approximate midpoint of the length of the catalyst bed. It should be understood that while this arrangement may be preferred in some reactors, other locations may be preferred in other reactor installations. A main consideration is to locate the layer of disks at a point where they are able to best provide the amount of flow resistance necessary without hindering the continuous flow of fluid through the reactor. Another consideration is to locate the layer at a point where the weight of the catalyst particles above the disks is sufficient to hold the disks in place. This may correspond to the midpoint of the catalyst bed, but it does not necessarily have to be there. If the flow objectives are better met with a layer of disks closer to one of the ends of the catalyst bed than the other, that arrangement would be contemplated by the invention. If it is found necessary to provide more than one layer of disks in order to best accomplish the flow objectives of a particular reactor, the invention is also broad enough to encompass such an arrangement.

Although the invention has been described in connection with a vertical reactor, the layer of disks can be incorporated in other reactor alignments as well. For example, if a normally horizontal reactor would benefit from the flow concepts of the present invention, the layer of disks could be incorporated in the catalyst bed provided that sufficient pressure is exerted on the ends of the bed to maintain the disks in place after destruction of the support mat occurs. This vertical configuration may require use of a more rigid, but still destructable, support base instead of a flexible mat. This rigid support base provides negligible flow resistance to fluid flow through the reactor and preferably is a mesh, network or screen.

It can now be appreciated that the invention provides a novel, economical and highly effective way to redistribute the flow in a reactor to a more uniform pattern by applying a uniform flow resistance across the catalyst bed. The use of spaced disks to provide such flow resistance is possible because there is no connecting structure between the disks to interfere with the flow of reactant fluid. Further, because the layer of disks does not depend on a structural connection to the reactor vessel, the reactor structure need not be modified in order to implement the invention.

Although the invention has been described in some detail in connection with the preferred embodiment, it will be appreciated that the invention need not necessarily be limited to all such details, and that changes to certain features of the preferred embodiment which do not alter the overall basic function and concept of the invention may be made without departing from the spirit and scope of the invention as defined in the claims.

What is claimed is:

1. In a reactor having a fluid inlet, a fluid outlet and a bed of catalyst particles therein, the improvement comprising:
   means for redistributing the flow of fluid through said bed, said means positioned within said bed and being structurally unconnected to the reactor.

2. The improvement of claim 1 wherein said bed comprises a layer of spaced barriers to fluid flow extending transversely of the catalyst bed, the barriers causing fluid to flow through the spaces therebetween.

3. The improvement of claim 2, wherein the spaced barriers comprise unconnected disks.

4. The improvement of claim 3, wherein the disks are spaced apart a distance such that they provide substantially uniform flow resistance to fluid flowing through the catalyst bed.

5. The improvement of claim 3, wherein the disks are spaced apart a distance greater than the average diameter of the catalyst particles, and wherein the average width of the disks is greater than the average diameter of the catalyst particles.

6. The improvement of claim 3, wherein the disks are comprised of material similar to that of the catalyst particles.

7. A method of redistributing the flow of fluid through a bed of catalyst particles in a reactor, comprising the steps of:
   providing a transversely extending layer of spaced barriers to fluid flow within the catalyst bed, the barriers being structurally unconnected to the reactor;
   the barriers being spaced apart a distance such that they provide substantially uniform flow resistance to fluid flowing through the catalyst bed, causing fluid to flow through the spaces therebetween; and
   removing the barriers along with the catalyst particles when spent catalyst particles are removed from the reactor.

8. The method of claim 7, wherein the spaced barriers comprise unconnected disks.

9. The method of claim 8, wherein the disks are comprised of material similar to that of the catalyst particles.

10. The method of claim 7, wherein the barriers are provided in the form of disks adhered to a support, the support being formed of material unable to withstand operating conditions inside the reactor when the reactor is operative, and the disks being formed of material capable of withstanding such operating conditions, whereby the support is destroyed during operation of the reactor, leaving the spaced barriers in place within the bed of catalyst particles.

11. The method of claim 10, wherein the disks are spaced apart a distance greater than the average diameter of the catalyst particles, and the average diameter of the disks is greater than the average diameter of the catalyst particles.

12. The method of claim 11, wherein the barrier support is flexible.

13. A flow distributor for use in a bed of catalyst particles in a reactor, comprising:
   a mat comprised of material which is unable to withstand at least one operating condition present inside the reactor, said mat not discernibly affecting fluid flow through the reactor;
   a plurality of disks adhered to the mat, the disks being comprised of material capable of withstanding the operating conditions inside the reactor; and
   the disks being spaced apart a predetermined distance;
   the disks being adapted to remain spaced apart during operation of the reactor after destruction of the mat by the heat inside the reactor, the spaces between the disks providing a flow path through the disks.

14. The flow distributor of claim 13, wherein the disks are glued to the mat.

15. The flow distributor of claim 13, wherein the mat is a screen.

16. The flow distributor of claim 13, wherein the disks are comprised of catalyst material.

17. The flow distributor of claim 13, wherein the disks are uniformly arranged on the mat.

18. The flow distributor of claim 17, wherein the disks are circular in plan view.

19. The flow distributor of claim 17, wherein the disks are polygonal in plan view.

* * * * *